Patented June 23, 1936

2,045,324

UNITED STATES PATENT OFFICE 2,045,324

AZO-DYESTUFFS

Friedrich Felix and Wilhelm Huber, Basel, Switzerland, assignors to Society of Chemical Industry in Basle, Basel, Switzerland No Drawing. Original application June 8, 1933, Serial No. 674,966. Divided and this application July 19, 1935, Serial No. 30,738. In Switzerland July 9, 1932

13 Claims. (Cl. 260—96)

This is a division of our application for patent Serial No. 674,966, filed in the U. S. A. on June 8, 1933, and in Switzerland on July 9, 1932.

According to this invention valuable dyestuffs are obtained by introducing into any azo-body at least one

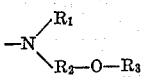

group, wherein $R_1$ stands for hydrogen, alkyl, aralkyl or acidyl, $R_2$ for an aliphatic hydrocarbon radical consisting of at least two carbon atoms, and $R_3$ for acyl. Here and throughout the specification alkyl not only means the homologues of the $CH_3$- and $C_2H_5$-groups, but also the substituted radicals thereof, such as $C_2H_4Cl$, $C_2H_4N(CH_3)_2$, $C_2H_4SO_3H$, and so forth. The term alkyl comprises also radicals with double bonds, such as, for example, the allyl radical. The process may consist in causing a diazo-compound of an aromatic base to react with a coupling component which contains at least one ω-acyl-oxalkyl-amino-group. Another form of the process consists in substituting in an aminoazo-dyestuff the primary or secondary amino-group by subsequent treatment with an ester of an alcohol which still contains at least one group capable of reacting with the primary or secondary amino-group of the dyestuff.

This may be done, for example, by causing the dyestuff which contains a primary or secondary amino-group to react with an aryl-sulfonic acid ester or sulfonic acid ester of a polyhydric alcohol with 2 or more C-atoms containing an OH-group which is esterified with an organic acid. Further, the hydrogen halide acid ester of the partially with an organic acid esterified polyhydric alcohol may be used. Further, in the case of dyestuffs having ω-oxalkylamino-groups which are obtainable by means of compounds, such as

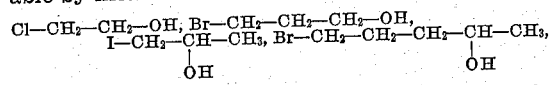

these groups can be esterified with an organic acid; or dyestuffs which contain an ω-halogenalkylamino-group, for instance a

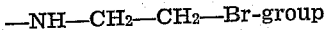

or a —NH—CH₂—CH₂—CH₂—Br-group, may be treated with the salt of an organic acid, such as sodium formate or sodium acetate.

The dyestuffs thus obtained have the general formula

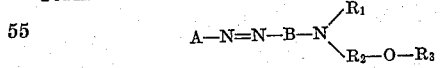

wherein A and B stand for nuclei of the benzene or naphthalene series, and $R_1$, $R_2$ and $R_3$ have the meanings already indicated above. These dyestuffs form yellow, orange, brown, red, violet, blue or black powders, and dissolve in solvents, such as water (if the dyestuffs contain sulfonic groups capable of forming alkali salts), or acetic ester or glacial acetic acid or pyridine (if the dyestuffs contain no $SO_3H$-group or $COOH$-group), to yellow, orange, brown, red, violet, blue or black solutions. They dye textiles, such as wool, silk, cotton, artificial silk from regenerated cellulose, cellulose esters and cellulose ethers and artificial silk consisting of such materials, in the shades indicated above.

As hereinbefore mentioned these dyestuffs may be obtained by combining any diazotizing components with such coupling components which contain the group

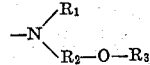

wherein $R_1$, $R_2$ and $R_3$ have the meanings already indicated above. In this case there may be used as diazotizing components aniline, toluidine, nitraniline, particularly para-nitraniline, chloraniline or a sulfonic or carboxylic acid of any of these, for instance sulfanilic acid, metanilic acid or the like, nitrochloraniline, particularly 2-chloro-4-nitraniline, 2,6-dichloro-4-nitraniline, anisidine, nitroanisidines and chloro-anisidines, particularly 4-nitro-ortho-anisidine; dinitroanilines, particularly 2,4-dinitraniline, dinitrochloro-anilines, particularly 2,4-dinitro-6-chloraniline; ortho-aminophenol or its homologues and analogues, such as ortho-aminocresols, nitroaminophenols, particularly 5-nitro-ortho-aminophenol, chloro-aminophenols and their sulfonic acids, naphthylamines, naphthylamine sulfonic acids, such as 1,8-amino-naphthol sulfonic acid, 1,8-aminonaphthol-3,6-disulfonic acid, or the toluene-sulfonic acid esters thereof; aminoazobenzene and its homologues and analogues, such as aminoazotoluene, aminoazobenzene-sulfonic acids, aminoazo-dyestuffs, such as the azo-dyestuff from 1 mol. of diazotized aniline sulfonic acid or naphthylamine sulfonic acid and one mol. of a middle component, such as aniline, cresidine, α-naphthylamine, α-naphthylamine-6- or 7-sulfonic acids, 1-amino-2-methoxynaphthalene, and so forth, or still more complicated diazo-compounds, as illustrated below.

With the diazotizing components just mentioned there are suitable as coupling components any bases, capable of coupling, which contain at the nitrogen atom, for instance, an ω-acyl-oxalkyl residue, for instance N(ω-acetoxyethyl)-aniline or N-ethyl-N(ω-acetoxyethyl)-aniline of the formula

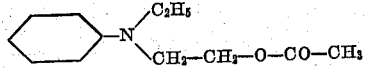

or N(ω-acetoxyethyl)-toluidines or -anisidines, N-methyl-N(ω-acetoxyethyl)-aniline, -toluidines or -anisidines.

The organic esters of aryl-aminoalcohols may be made, for example, by condensing the corresponding amine, such as aniline, ethylaniline, 1-amino-2-methoxy-5-methyl-benzene or the like, with an organic ester of a polyhydric alcohol, which contains only one non-esterified hydroxyl-group, or by treatment with their sulfuric acid esters or arylsulfonic acid esters. They may also be obtained by condensing an organic ester of a halogenated alcohol with the amine or advantageously by esterifying the corresponding aryl-amino-alcohol with an organic acid, or by causing an arylaminohalogenalkyl compound to react with a salt of an organic acid, for instance with an alkali acetate or formate, or, finally, by reaction between an aryl-compound which contains in the nucleus a substituent capable of reaction, for instance a halogen in ortho-position to the nitro-group, and an organic ester of an aminoalcohol.

The dyestuffs of the above general formula may also be obtained if the diazotizing component contains the characteristic

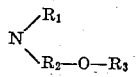

group, wherein $R_1$, $R_2$ and $R_3$ have the meanings already indicated above. Such methods of producing these dyestuffs are described further below and are illustrated by examples.

As already mentioned these dyestuffs may be used for dyeing textiles of various kinds. They can of course also be used for other purposes, for example as pigments, for dyeing lacquers and varnishes, for dyeing paper, and so forth. They can also be used as intermediate products for the production of further azo-dyestuffs, and if required for the production of further dyestuff-groups.

The non-sulfonated dyestuffs are in particular used for dyeing esters and ethers of cellulose, and when brought into suitable form or suspended in a suitable medium, have a pronounced affinity for cellulose esters and ethers, particularly acetate silk, which they dye very fast tints.

The non-sulfonated dyestuffs may be brought into a finely subdivided form for example by grinding them with a dispersing agent, such as the sulfonated residue from the manufacture of benzaldehyde, a turpentine oil or the like, in the presence of water to produce a fine paste, or they may be converted in presence of further quantities of the aforesaid or other auxiliary substances, for example sulfite cellulose waste liquor by cautiously drying them preferably in a vacuum, at a temperature not too high, into dry pulverizable preparations.

The following may further be mentioned for dyeing acetate-silk:—

Yellow to orange tints are obtained by coupling aniline or para-nitraniline with N(ω-acetoxyethyl)-aniline; red to Bordeaux-red tints by coupling para-nitraniline, 4-nitro-ortho-anisidine or 2-chloro-4-nitraniline with N-ethyl-N(ω-acetoxyethyl)-aniline.

The following examples illustrate the invention, the parts being by weight:—

*Example 1*

13.8 parts of finely pulverized para-nitraniline are stirred with 300 parts of water and 25 parts of concentrated hydrochloric acid and the mixture is diazotized in the usual manner by means of 7 parts of sodium nitrite. The diazo-solution after addition of sodium acetate to neutralize the mineral acid is mixed with a solution of 20.7 parts of N-ethyl-N(ω-acetoxyethyl)-aniline in the necessary quantity of dilute hydrochloric acid. After a short stirring, the dyestuff formation is finished. The dyestuff thus obtained of the formula

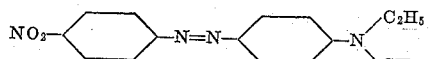

is filtered and washed. It is a red powder which, when reduced to a fine state of subdivision by a suitable addition, dyes acetate silk intense fast scarlet red tints. The N-ethyl-N(ω-acetoxyethyl)-aniline used in this example may be made, for instance as follows:—

165 parts of N-ethyl-N(ω-hydroxyethyl)-aniline are mixed with 1 molecular proportion of acetic anhydride and 1 molecular proportion of anhydrous sodium acetate, whereupon reaction begins with an intense development of heat. When the reaction is at an end, the mass is distilled in a vacuum and there is obtained the N-ethyl-N(ω-acetoxyethyl)-aniline of the formula

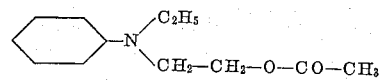

in the form of an oil as clear as water, and boiling at 126° C. under 2 mm. pressure; the yield is good.

*Example 2*

The diazo-solution made in the usual manner from 16.8 parts of 4-nitro-ortho-anisidine is mixed with 13.6 parts of crystallized sodium acetate and added to a solution of 20.7 parts of N-ethyl-N(ω-acetoxyethyl)-aniline in dilute hydrochloric acid. The dyestuff thus obtained of the formula

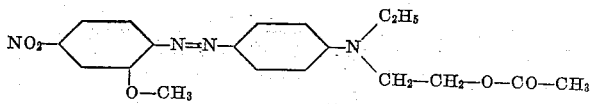

is a dark red powder which dyes acetate silk fast red tints.

*Example 3*

17.25 parts of 2-chloro-4-nitraniline are ground with water and diazotized by means of 25 parts of concentrated hydrochloric acid and 7 parts of sodium nitrite. The diazo-solution thus obtained is mixed with 13.6 parts of crystallized sodium acetate and allowed to flow into a solution of 20.7 parts of N-ethyl-N(ω-acetoxyethyl)-aniline in dilute hydrochloric acid. The dyestuff of the formula

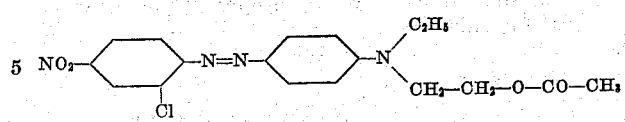

separates in the form of a red-violet powder; it dyes acetate silk magnificent bluish-red tints.

*Example 4*

19.5 parts of sodium sulfanilate are dissolved in 200 parts of water and the solution is diazotized by means of 7 parts of sodium nitrite and 25 parts of concentrated hydrochloric acid. This diazo-solution is mixed with a solution of 20.7 parts of N-ethyl-N(ω-acetoxyethyl)-aniline. The dyestuff thus obtained of the formula

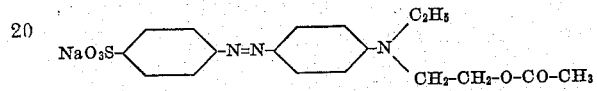

dyes wool in an acid bath orange-yellow tints. It may be used for producing printing effects on acetate silk.

*Example 5*

Into a solution of 20.7 parts of N-ethyl-N(ω-acetoxyethyl)-aniline in dilute hydrochloric acid there is allowed to flow a diazo-solution prepared in known manner from 20.7 parts of 2:6-dichloro-4-nitroaniline. When coupling has been completed by the addition of sodium acetate the dyestuff of the formula

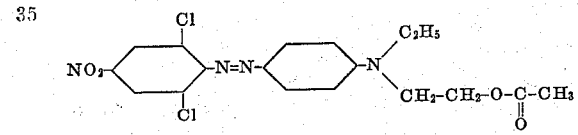

which has separated, is filtered. It is a dark brown powder, soluble in ethyl acetate to a yellow-brown solution and capable of dyeing acetate silk yellow-brown tints, which can be discharged to a pure white.

*Example 6*

17.25 parts of 2-chloro-4-nitraniline are ground with water and diazotized by means of 25 parts of concentrated hydrochloric acid and 7 parts of sodium nitrite. The diazo solution thus obtained is mixed with 13.6 parts of crystallized sodium actate and allowed to flow into a solution of 19.3 parts of N-methyl-N(ω-acetoxyethyl)-aniline in dilute hydrochloric acid. The dyestuff of the formula

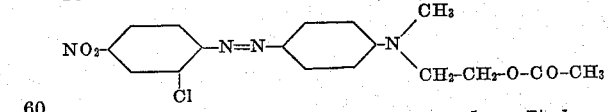

separates in the form of a dark powder. It dyes acetate artificial silk vivid red tints.

What we claim is:—

1. Azo-dyestuffs of the general formula

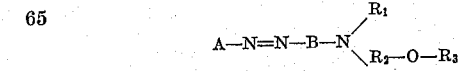

wherein A and B stand for nuclei of the benzene or naphthalene series, $R_1$ stands for hydrogen or an alkyl-group, $R_2$ stands for an aliphatic hydrocarbon radical consisting of at least two carbon atoms, and $R_3$ stands for an acyl-group consisting of at least one and not more than two carbon atoms, which products form yellow, orange, brown, red, violet, blue or black powders, dissolve in solvents to yellow, orange, brown, red, violet, blue or black solutions, and dye textiles similar shades.

2. Azo-dyestuffs of the general formula

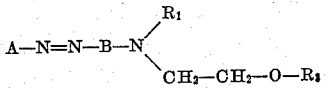

wherein A and B stand for nuclei of the benzene or naphthalene series, $R_1$ stands for hydrogen or an alkyl-group, and $R_3$ stands for an acyl-group consisting of at least one and not more than two carbon atoms, which products form yellow, orange, brown, red, violet, blue or black powders, dissolve in solvents to yellow, orange, brown, red, violet, blue or black solutions, and dye textiles similar shades.

3. Monoazo-dyestuffs of the general formula

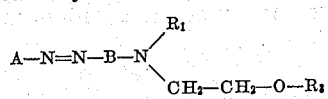

wherein A and B stand for nuclei of the benzene or naphthalene series, $R_1$ stands for hydrogen or an alkyl-group, and $R_3$ stands for an acyl-group consisting of at least one and not more than two carbon atoms, which products form yellow, orange, brown, red, violet or blue powders, dissolve in solvents to yellow, orange, brown, red, violet or blue solutions, and dye textiles similar shades.

4. Unsulfonated monoazo-dyestuffs of the general formula

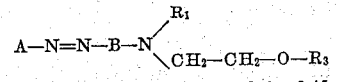

wherein A and B stand for nuclei of the benzene or naphthalene series, $R_1$ stands for hydrogen or an alkyl-group, and $R_3$ stands for an acyl-group consisting of at least one and not more than two carbon atoms, which products form yellow, orange, brown, red, violet or blue powders, dissolve in acetic ester to yellow, orange, brown, red, violet or blue solutions, and dye acetate artificial silk similar shades.

5. Unsulfonated monoazo-dyestuffs of the general formula

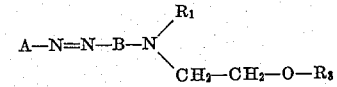

wherein A stands for a benzene nucleus, B stands for a nucleus of the benzene or naphthalene series, $R_1$ stands for hydrogen or an alkyl-group, and $R_3$ stands for an acyl-group consisting of at least one and not more than two carbon atoms, which products form yellow, orange, brown, red, violet or blue powders, dissolve in acetic ester to yellow, orange, brown, red, violet or blue solutions, and dye acetate artificial silk similar shades.

6. Unsulfonated monoazo-dyestuffs of the general formula

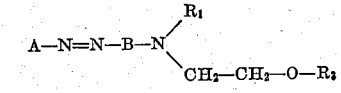

wherein A stands for a benzene nucleus carrying a nitro-group in para-position to the —N=N- group, B stands for a nucleus of the benzene or naphthalene series, $R_1$ stands for hydrogen or an alkyl-group, and $R_3$ stands for an acyl-group consisting of at least one and not more than two carbon atoms, which products form orange, brown, red, violet or blue powders, dissolve in acetic ester to orange, brown, red, violet or blue solutions, and dye acetate artificial silk similar shades.

7. Unsulfonated monoazo-dyestuffs of the general formula

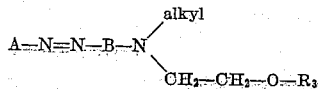

wherein A and B stand for nuclei of the benzene series, the nucleus A carrying a nitro-group in para-position to the —N=N-group, and $R_3$ stands for an acyl-group consisting of at least one and not more than two carbon atoms, which products form orange, brown, red or violet powders, dissolve in acetic ester to orange, brown, red or violet solutions, and dye acetate artificial silk similar shades.

8. Unsulfonated monoazo-dyestuffs of the general formula

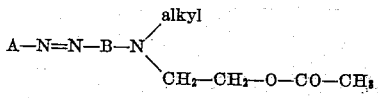

wherein A and B stand for nuclei of the benzene series, the nucleus A carrying a nitro-group in para-position to the —N=N-group, which products form scarlet, red or violet powders, dissolve in acetic ester to scarlet, red or violet solutions, and dye acetate artificial silk similar shades.

9. Unsulfonated monoazo-dyestuffs of the general formula

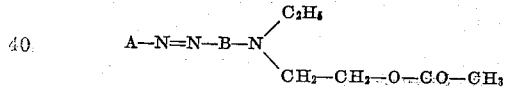

wherein A and B stand for nuclei of the benzene series, the nucleus A carrying a nitro-group in para-position to the —N=N-group, which products form scarlet, red or violet powders, dissolve in acetic ester to scarlet, red or violet solutions, and dye acetate artificial silk similar shades.

10. Unsulfonated monoazo-dyestuffs of the general formula

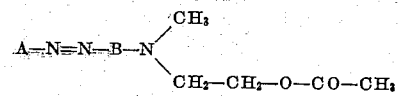

wherein A and B stand for nuclei of the benzene series, the nucleus A carrying a nitro-group in para-position to the —N=N-group, which products form scarlet, red or violet powders, dissolve in acetic ester to scarlet, red or violet solutions, and dye acetate artificial silk similar shades.

11. The non-sulfonated monoazo-dyestuff of the formula

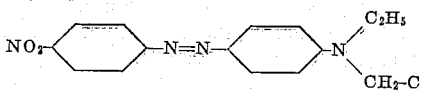

which product forms a scarlet-red powder, dissolves in acetic ester to a scarlet, red solution and dyes acetate artificial silk fast scarlet shades.

12. The non-sulfonated monoazo-dyestuff of the formula

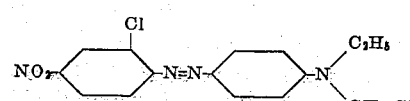

which product forms a dark powder, dissolves in acetic ester to a blue-red solution, and dyes acetate artificial silk pure blue-red shades.

13. The non-sulfonated monoazo-dyestuff of the formula

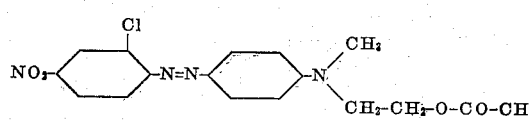

which product forms a dark powder dissolves in acetic ester to a red solution and dyes acetate artificial silk red shades.

FRIEDRICH FELIX.
WILHELM HUBER.